United States Patent Office 3,364,273
Patented Jan. 16, 1968

3,364,273
CYCLOOLIGOMERIZATION USING NICKEL (0)
POLYDENTATE LIGAND
Reginald F. Clark, Baton Rouge, La., Charles D. Storrs, Niagara Falls, N.Y., and George B. Barnes, Houston, Tex., assignors to Columbian Carbon Company, New York, N.Y., a corporation of Delaware
No Drawing. Filed Feb. 23, 1966, Ser. No. 529,231
8 Claims. (Cl. 260—666)

ABSTRACT OF THE DISCLOSURE

The use of a novel heterogeneous nickel coordination catalyst to cyclooligomerize open chain conjugated aliphatic diolefins is described. These insoluble catalysts are coordination complexes of nickel (0) with a polyester of a trivalent Group V–A element containing at least three atoms of said Group V–A element. The production of these complexes by replacing carbon monoxide from a nickel carbonyl compound with such polyester is illustrated, as is the use of such catalyst to convert butadiene to cyclooctadiene, vinylcyclohexene and cyclododecatriene and the recovery and reuse of such catalyst. Polyester production by transesterification of monomeric Group V–A esters with glycols and direct esterification of a Group V–A halides or oxides with glycols is shown.

---

This invention relates to methods of preparing cycloolefins. The invention also relates to certain new compositions of matter which are useful as catalysts. These novel catalyst compositions have particular utility in the preparation of cycloolefins.

The preparation of cycloolefins employing catalyst complexes which are prepared by replacement of one or more carbonyl groups from nickel carbonyl, by various organo metals and organo derivatives of other elements and in particular the phosphines and the phosphites, are well-known in the prior art. See Sellers et al., U.S. 2,991,-317, Bosmajian U.S. 3,004,081, and Shechter U.S. 3,187,-062. Although the utilization of these complexes as catalysts for the preparation of cycloolefins from open chain conjugated diolefins have proven to be highly effective, they have been characterized by their solubility in the cyclic compounds which are produced. Thus, in the prior art processes when an open chain conjugated diolefin was treated with the available prior art catalysts, the catalyst could not easily be recovered due to its solubility in the cycloolefins which were formed. As a result, these prior art catalysts could only be used on a one-time basis, since recovery of the dissolved catalyst was economically unfeasible, as well as impractical. Notwithstanding the fact that the prior art processes have proven to be effective, the present process utilizing a novel polymeric catalyst, as described in detail below, has given outstandingly superior results.

It is an object of this invention to provide a process for the preparation of cycloolefinic compounds.

It is another object of this invention to prepare cycloolefinic compounds having at least eight carbon atoms and at least two olefinic linkages in the ring, from open chain conjugated diolefins utilizing a novel catalyst which is insoluble in the products formed.

It is an additional object of this invention to prepare a novel catalyst composition.

It is a further object of this invention to prepare a novel catalyst composition which may be recovered and reused in the preparation of cycloolefins.

Other objects will be apparent to those skilled in the art from a consideration of the following description.

The above, and other, objects of this invention are achieved by reacting a conjugated open chain diolefin with our novel polymeric catalyst, which is a co-ordination complex of zero-valent nickel and a polydentate ligand comprising a polymeric ester of a trivalent Group V–A element, to produce cycloolefinic compounds. The catalyst of this invention is insoluble in the cycloolefinic compounds produced and thus may be recovered and reused in subsequent reactions. The aforementioned characteristics permit the use of our novel catalyst as a fixed bed catalyst, providing an added advantage over the prior art.

The starting material for this invention is a conjugated open chain diolefin, preferably one which is in a gaseous or vapor state at room temperature and atmospheric pressure, and preferably 1,3-butadiene. Other conjugated open chain diolefins, particularly 1,3-diolefins include: 2-methyl-1, 3-butadiene (isoprene); 1,3-pentadiene (piperylene); phenyl diolefins; 2-chloro-1, 3-butadiene (chloroprene); 2,3-dichloro-1, 3-butadiene and 2,3-dimethyl-1, 3-butadiene. Other partially substituted halogen derivatives may be used, including mixed halogen derivatives such as chlorofluoro-1, 3-butadienes. Other open chain conjugated diolefins which form cycloolefins having at least eight carbon atoms in the ring may also be used, an example being 2,4-hexadiene.

The catalyst of the present invention is a co-ordination complex of zero-valent nickel and a polydentate ligand comprising a polymeric ester of a trivalent Group V–A element. It is to be understood, for definitional purposes, that the term polydentate ligand when used in this application refers to a molecule having at least three (3) atoms capable of co-ordinating with zero-valent nickel. The polydentate ligand portion of the co-ordination complex may be represented by the formulae:

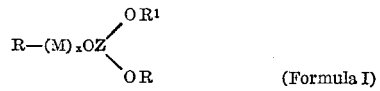

(Formula I)

and

(Formula II)

In Formula I, Z is a trivalent Group V–A element, M is

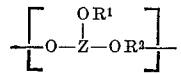

$R^1$ is

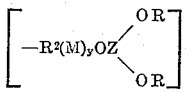

or R, $R^2$ is a divalent organic radical, R is an organic radical or a hydrogen radical, $x$ is from 1 to ∞, $y$ is from 0 to ∞, and $x+y$ is at least 2. In Formula II, Z is a trivalent Group V–A element, $M^1$ is

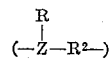

$R^3$ is an organic radical, halogen or hydrogen, $R^2$ is a divalent organic radical, $R^4$ is

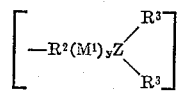

or $R^3$, $x$ is from 1 to ∞, $y$ is from 0 to ∞, and $x+y$ is at least 2. Although $x$ and $y$ can each be infinite, it has been found that these values seldom exceed 1000 and are usually less than about 200. The wide variety of radicals which may be employed in the above formulae will be apparent from a consideration of the following methods of preparation.

In Formulae I and II, Z is a trivalent element selected from Group V-A of the Periodic Table. In the practice of the invention, it is preferred to use an element selected from the group consisting of phosphorus, arsenic and antimony. The use of phosphrous is especially preferred in the instant invention.

The preparation of the trivalent Group V-A polymeric ester (polydentate ligand) portion of the co-ordination complex may be accomplished by a number of methods. The method employed to produce a polydentate ligand such as is represented by Formula I, is naturally different from the method employed to produce the polydentate ligand represented by Formula II. The polymeric esters of Formula I would be phosphites, arsenites, or antimonites based upon the respective Group V-A element being bonded to an oxygen atom, and the oxygen being bonded to a carbon atom. The polymeric esters of Formula II would be termed phosphines, arsines or stibines since the respective Group V-A element is bonded directly to a carbon atom.

The polymeric Group V-A esters of Formula I can be produced by methods well-known in the art. Exemplary of such methods are direct esterification and transesterification. The direct esterification method involves the interaction of a polyhydroxyl compound and a trivalent Group V-A halide or oxide. The transesterification method, which is the preferred method, involves the interaction of an ester of a trivalent Group V-A element and a polyhydroxyl compound.

Exemplary of the trivalent Group V-A halides and oxides which may be used to advantage, in the direct esterification method, for the preparation of polymeric Group V-A esters, as represented by Formula I, are:

phosphorus tribromide
phosphorus trichloride
phosphorus triiodide
arsenic tribromide
arsenic trichloride
arsenic triiodide
antimony tribromide
antimony trichloride
antimony triiodide
arsenic trioxide
antimony trioxide
phosphorus trioxide The trichlorides and trioxides of phosphorus, are especially preferred in the practice of the invention.

The polyhydroxyl compounds employed in the direct esterification method can be polybasic alcohols, and preferably are dibasic alcohols. Exemplary of these alcohols are:

ethylene glycol
polyethylene glycol
glycerol
hexylene glycol
propylene glycol
polypropylene glycol
1,4-butanediol
1,3-butanediol
2-hydroxymethyl-2-methylpropanediol
polyvinyl alcohol
p,p'-isopropylidenediphenol
bis phenol B
dihydroxydiphenyl sulfone p,p'-Isopropylidenediphenol (bisphenol A) is especially preferred for use in this invention.

It will be apparent to one skilled in the art, that if 1,4-butanediol were reacted with $PCl_3$ and $R^2$ for Formula I would be a butylene radical, and that R would be either a chlorine radical or a hydroxybutyl radical.

The method which is preferred for the preparation of the polymeric Group V-A ester (polydentate ligand), represented by Formula I, is by transesterification. The polyhydroxyl compounds employed in the transesterification method are the same as are used in the direct esterification method, described above. The Group V-A ester, which interacts with the polyhydroxyl compound to produce the transester, may be represented by the formula:

$$(RO)_3Z$$

wherein Z is a trivalent Group V-A element preferably selected from the group consisting of phosphorus, arsenic and antimony, and R is an organic or substituted organic radical. R is preferably a hydrocarbyl radical, and it is especially preferred when R is an aryl radical. Examples of open-chain alkyl radicals preferably having less than about 20 carbon atoms, as the radical "R," are methyl, ethyl, propyl, butyl, hexyl, dodecyl, isooctyl, isobutyl and isopentyl. Useful cycloalkyl hydrocarbon radicals include cyclopentyl, cyclohexyl, cyclooctyl, and similar groups. Representative aryl radicals are phenyl, biphenyl, $\alpha$-naphthyl, $\beta$-naphthyl and p-tolyl.

Thus, it will be apparent to those skilled in the art, that R of Formula I may be either the organic residue of the trivalent Group V-A ester employed as the starting material, for example, the phenyl radical, if triphenyl phosphite were the ester employed; or else, it could be the residue of the polyhydroxyl compound employed, e.g. a hydroxybutyl radical, if 1,4-butanediol were the polyhydroxyl compound employed.

The polymeric Group V-A esters of Formula II can be produced by methods well-known in the art. An example of one of such methods, involves the interaction of a trivalent Group V-A halide and a polyhalogenated organic compound in the presence of sodium. It is preferred to use polyhalogenated compounds in which the halogens are not on the same carbon atom. The trivalent Group V-A halides which are useful in this reaction have been discussed above, in connection with the direct esterification method used for the production of polymeric phosphites, arsenites and antimonites. Those trivalent Group V-A halides can be employed equally well in this method for the production of polymeric phosphines, arsines and stibines. The trichlorides of phosphorus, arsenic and antimony are preferred. Exemplary of the polyhalogenated compounds which may be employed to prepare the arsines, stibines and phosphines, represented by Formula II, are:

ethylene chloride
trimethylene bromide
ethylene bromide
1,4-dibromobenzene
1,4-dichlorobenzene
1,3-diiodobenzene
1,2,4-tribromobenzene
1,3,5-trichlorobenzene
1,2,4-triiodobenzene
1,2,3,5-tetrabromobenzene
1,2,3,4-tetraiodobenzene
4,4'-dichlorodiphenyl
4,4'-dibromodiphenyl
1,2-dichloronaphthalene
1,4-dichloronaphthalene Of the compounds listed above, the dihalogenated compounds are preferred; 1,4-dichlorobenzene (p-dichlorobenzene) being especially preferred.

It would be apparent to one skilled in the art, that if 1,4-dichlorobenzene were reacted with phosphorus trichloride, for example, that $R^2$ of Formula II would be a phenylene radical and that $R^3$ would be either a chlorine radical or a chlorobenzene radical.

To form the catalyst, the polydentate ligand, whether it be a polymeric phosphite, arsenite, antimonite, phosphine, arsine or stibine, is reacted with a nickel carbonyl, such as, nickel tetracarbonyl, or a complex in which from one to three of the CO groups have been replaced by an ester of a Group V–A element. Examples of such compounds are: tris triphenylphosphite nickel carbonyl, bis triphenyl arsine nickel dicarbonyl, tri p-tolyl phosphite nickel tricarbonyl, etc. Any number of the carbonyl groups attached to the nickel atom may be replaced by the polydentate ligand, to form a co-ordination complex of zero-valent nickel and a polydentate ligand. Thus, tetrakis, tris, bis and mono substituted polydentate ligand nickel complexes may readily be produced. The ratio of the ligand to nickel used in the preparation of the catalyst can be from about 1:10 to about 10:1. The nickel carbonyl and the polymeric polydentate ligand can be reacted according to procedures which are well-known in the prior art. Advantageously, the reaction can be conducted at about atmospheric pressure, or at a somewhat reduced pressure, and at a temperature from about room temperature, or lower, to about 150° C. or higher.

The catalysts of this invention can be used alone, or in combination with known cyclization catalyst modifiers, such as: triethyl aluminum, triisobutyl aluminum, diethyl aluminum chloride and diethyl aluminum hydride.

The concentration of catalyst in the reaction is suitably 0.001% to 10% by weight of the conjugated diolefin monomer, and the preferred quantity is between 0.05% and 4% by weight. Quantities in excess of 10% may be used, but the results obtained are not proportionately beneficial.

Polymerization inhibitors which may be present if desired include phenol, catechol, p-tertiary-butyl catechol, resorcinol, hydroquinone, and other known compounds. Polymerization inhibitors may actually be removed from the diolefin by means such as pellets of potassium hydroxide, prior to the reaction. However, when the polymerization inhibitors are present in normal low concentrations, such as 100 p.p.m., they do not significantly affect the reactivity of the catalyst. If such inhibitors are present and are not removed, the amounts thereof may be between about 0.001% and 4% based on the weight of the open-chain conjugated diolefin. It is not unusual to find that amounts in this range have been added to materials such as butadiene to stabilize them during storage. Pressures between about 20 p.s.i.g. and about 1,000 p.s.i.g. are applicable, usually depending upon the temperature at which the reaction is conducted, suitably between about 40° C. and 170° C., the optimum temperature being between about 90° C. and 150° C. The times of reaction depend in large part upon the temperature; suitable times are between 0.05 and 25 hours, and more desirably between about 0.2 and 10 hours.

The reaction may be batch or continuous, and with or without a solvent. Suitable solvents are paraffinic, cycloparaffinic, olefinic, cycloolefinic and aromatic hydrocarbons, including benzene, toluene, petroleum, naphtha, hexane, heptane, isooctane, cyclohexane, cyclopentane, cyclooctadiene, and similar materials. Other solvents known to be useful for similar reactions, such as tetrahydrofuran, are optional. Most desirably, the only materials present in the reaction zone in substantial quantities are the diolefin monomer, the catalyst, and the product of reaction.

The products of the reaction are 1,5-cyclooctadiene and 1,5,9-cyclododecatriene, with 4-vinylcyclohexene being a reaction byproduct. The products of reaction are of known utility, as solvents, monomers useful in polymerizations, and as chemical intermediates.

Example 1

57 g. (0.25 mole) of p,p'-isopropylidenediphenol (Bisphenol A) and 78 grams (0.25 mole) of triphenylphosphite were heated to 100° C. in a 300 milliliter flask, with stirring, until the mixture became homogeneous. The mixture was then transferred to a 500 milliliter one-necked flask. A spin dryer was utilized for agitation and a pressure of 0.3–0.5 mm. was maintained for 24 hours. The reaction mixture was heated to 90° C. during this time. 45 grams of phenol was removed from the reaction mixture during the 24 hour period.

Example 1A 85 grams of the polydentate ligand produced in Example 1 was reacted with 17 grams of nickel carbonyl in a toluene solution. The polydentate ligand in toluene was dropped slowly into the nickel carbonyl and a vigorous evolution of carbon monoxide was evidenced. A white polymeric solid was obtained from this reaction which is insoluble in toluene, ethers, and other similar solvents.

Example 2

104 grams of 1,3-butadiene was pressured into a 300 milliliter autoclave containing 1.5 grams of the polymeric catalyst produced in Example 1A. The temperature was maintained at 125° C. for a period of 1 hour. By weight, 95% of the 1,3-butadiene was converted to product and the selectivity was 17% for cyclododecatriene, 61% for cyclooctadiene and 10% for vinylcyclohexene.

Example 3

Into the same autoclave as was employed in Example 2, which contained the remaining polymeric catalyst utilized in Example 2, 104 grams of 1,3-butadiene was added by pressuring the butadiene into the autoclave. The temperature was maintained at 125° C. for a period of one hour. The autoclave was then cooled, vented, and the liquid product was decanted and vacuum distilled. By weight, 94% of the 1,3-butadiene was converted to cycloolefinic product.

Example 4

104 grams of 1,3-butadiene was pressured into a 300 milliliter autoclave, as in Example 2 above, however, the temperature was maintained at 125° C. for 2 hours, instead of 1 hour. By weight, 90% of the 1,3-butadiene was converted to product and the selectivity was 12% for cyclododecatriene, 73% for cyclooctadiene and 11% for vinylcyclohexene.

Example 5

The amount of butadiene added and the conditions employed were identical to those in Example 4, except that sufficient triethylaluminum was added to the autoclave contents to produce an aluminum to nickel ratio of 4.6 to 1. By weight, 93% of the 1,3-butadiene was converted to product and the selectivity was 24% for cyclododecatriene, 61% for cyclooctadiene and 11% for vinylcyclohexene.

Example 6

18 grams (0.2 mole) of 1,4-butanediol, 62 grams (0.2 mole) of triphenylphosphite, and 0.2 gram (0.01 mole) of sodium were added to a 300 milliliter flask. The mixture was heated for two (2) hours at 100° C. with stirring. The mixture was then transferred to a 500 milliliter one-necked flask. A spin dryer was utilized for agitation, and a pressure of 2 mm. was maintained for 24 hours. The reaction mixture was heated to 85° C. during this period. 38 grams of phenol was removed from the reaction mixture during the 24 hour period.

Example 6A 5 grams of the polydentate ligand product of Example 6 was reacted with 2.1 grams of nickel carbonyl in a toluene solution. The polydentate ligand in toluene was dropped slowly into the nickel carbonyl and a vigorous evolution of carbon monoxide indicated the reaction had gone to near completion. A polymeric solid was obtained from this reaction which was insoluble in toluene, ethers, and other similar solvents.

Example 7

98 grams of 1,3-butadiene was pressured into a 300 milliliter autoclave containing 0.5 gram of the polymeric catalyst produced in Example 6A, 3 milliliters of a 10% solution of triethylaluminum in benzene, and 25 grams of benzene. The temperature was maintained at 125° C. for 1½ hours. By weight, 91% of the 1,3-butadiene was converted to product and the selectivity was 20% for cyclododecatriene, 63% for cyclooctadiene and 9% for vinylcyclohexene.

What is claimed is:

1. In a process for the production of a cycloolefinic compound containing at least 8 carbon atoms and at least two ethylenic double bonds in the ring by contacting an open chain conjugated aliphatic diolefin with a nickel coordination catalyst, the improvement comprising employing as said catalyst a heterogeneous coordination complex of nickel (0) with a polydentate ligand, said ligand being a polyester of a trivalent Group V-A element containing at least three atoms of said Group V-A element.

2. The process of claim 1 in which said polydentate ligand is

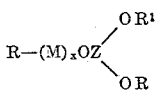

wherein Z is a Group V-A element selected from the group consisting of phosphorus, arsenic and antimony, $M^1$ is

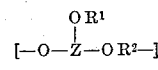

$R^1$ is

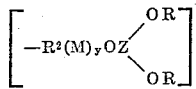

or R, $R^2$ is a divalent hydrocarbyl radical, R is a hydrocarbyl, hydroxyhydrocarbyl or hydrogen radical, $x$ is at least 1, $y$ is 0 to 1000, and $x+y$ is at least 2.

3. The process of claim 1 in which said polydentate ligand is

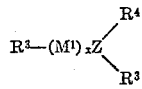

wherein Z is a Group V-A element selected from the group consisting of phosphorus, arsenic and antimony, M is

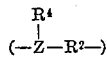

$R^3$ is a hydrocarbyl, a halohydrocarbyl, halogen or hydrogen radical, $R^2$ is a divalent hydrocarbyl radical and $R^4$ is

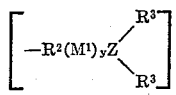

or $R^3$, $x$ is at least 1, $y$ is 0 to 1000, and $x+y$ is at least 2.

4. The process of claim 3 in which said polydentate ligand comprises the interaction product of a trihydrocarbyl phosphite and a glycol.

5. The process of claim 4 in which said trihydrocarbyl phosphite is triphenylphosphite.

6. A coordination complex of nickel (0) with a polydentate ligand, said ligand being a polyester of a trivalent Group V-A element containing at least three atoms of said Group V-A element.

7. The composition of claim 6 in which said polyester is

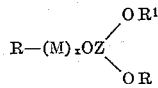

wherein Z is a trivalent Group V-A element selected from the group consisting of phosphorus, arsenic and antimony, M is

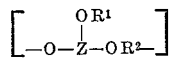

$R^1$ is

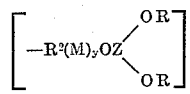

or R, $R^2$ is a divalent hydrocarbyl radical, R is a hydrocarbyl, hydroxyhydrocarbyl or hydrogen radical, $x$ is at least 1, $y$ is 0 to 1000, and $x+y$ is at least 2.

8. The composition of claim 6 in which said polymeric ester is

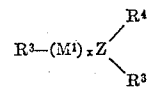

wherein Z is a trivalent Group V-A element selected from the group consisting of phosphorus, arsenic and antimony, $M^1$ is

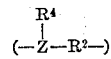

$R^3$ is a hydrocarbyl, halohydrocarbyl, halogen or hydrogen radical, $R^2$ is a divalent hydrocarbyl radical and $R^4$ is

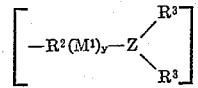

or $R^3$, $x$ is at least 1, $y$ is 0 to 1000, and $x+y$ is at least 2.

References Cited

UNITED STATES PATENTS

| | | | |
|---|---|---|---|
| 2,504,016 | 4/1950 | Foster | 260—666 |
| 2,964,575 | 12/1960 | Sekul | 260—666 |
| 2,972,640 | 2/1961 | Burks | 260—666 |
| 2,991,317 | 7/1961 | Sellers | 260—666 |
| 3,004,081 | 10/1961 | Bosmojean | 260—666 |
| 3,152,158 | 10/1964 | Clark | 260—666 |
| 3,187,062 | 6/1965 | Shechter | 260—666 |
| 3,219,714 | 11/1965 | Kutepow | 260—666 |
| 3,219,716 | 11/1965 | Wittenberg | 260—666 |
| 3,223,741 | 12/1965 | Feldman | 260—666 |
| 3,277,099 | 10/1966 | Seibt | 260—666 |
| 3,249,641 | 5/1966 | Storrs et al. | 260—666 |

DELBERT E. GANTZ, *Primary Examiner.*

V. O'KEEFE, *Assistant Examiner.*